United States Patent
Benkreira et al.

(10) Patent No.: US 10,650,422 B1
(45) Date of Patent: May 12, 2020

(54) AUGMENTED PROJECT LISTS WITH PRICE INFORMATION

(71) Applicant: Capital One Services, LLC, McLean, VA (US)

(72) Inventors: Abdelkader M'Hamed Benkreira, New York, NY (US); Michael Mossoba, Arlington, VA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/386,424

(22) Filed: Apr. 17, 2019

(51) Int. Cl.
| | |
|---|---|
| *G06Q 30/00* | (2012.01) |
| *G06Q 30/02* | (2012.01) |
| *G06Q 30/06* | (2012.01) |
| *G06T 19/00* | (2011.01) |
| *G06K 9/00* | (2006.01) |
| *G06F 40/279* | (2020.01) |

(52) U.S. Cl.
CPC ....... *G06Q 30/0283* (2013.01); *G06F 40/279* (2020.01); *G06K 9/00456* (2013.01); *G06Q 30/0623* (2013.01); *G06Q 30/0641* (2013.01); *G06T 19/006* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 8,396,758 B2* | 3/2013 | Paradise | G06Q 30/02 705/26.62 |
| 9,430,766 B1* | 8/2016 | Kraft | G06Q 20/352 |
| 9,690,850 B2 | 6/2017 | Radcliffe | |
| 2011/0145093 A1* | 6/2011 | Paradise | G06Q 30/02 705/26.41 |
| 2012/0062596 A1 | 3/2012 | Bedi et al. | |
| 2013/0149677 A1* | 6/2013 | Slone | A47J 36/321 434/127 |
| 2014/0100997 A1* | 4/2014 | Mayerle | G06Q 30/0643 705/27.2 |
| 2014/0144977 A1* | 5/2014 | Argue | G06Q 30/0633 235/375 |
| 2015/0213058 A1* | 7/2015 | Ambardekar | G06K 9/00671 707/706 |
| 2017/0237899 A1* | 8/2017 | Wexler | G06F 16/51 348/207.11 |
| 2019/0000382 A1* | 1/2019 | Fitzpatrick | A61B 5/681 |

(Continued)

OTHER PUBLICATIONS

Apple, "Recognizing Objects in Live Capture", Apple Developer Documantation, dated Jul. 8, 2018. (Year: 2018).*

(Continued)

*Primary Examiner* — Mark A Fadok
(74) *Attorney, Agent, or Firm* — DLA Piper LLP (US)

(57) ABSTRACT

In some embodiments, the present disclosure relates to a method for augmenting project lists with price information. The method can include: capturing an image using a camera of a user device; identifying a project list within the captured image; extracting, from the captured image, a list of items associated with the project list, the list of items represented as text; retrieving price information for one or more of the list items; and displaying, on the user device, an augmented image comprising the captured image and the price information.

13 Claims, 6 Drawing Sheets

(56) References Cited

U.S. PATENT DOCUMENTS

2019/0197308 A1* 6/2019 Yeh .................... G06K 9/00469
2019/0318417 A1* 10/2019 Gumaru ............... G06K 7/1413

OTHER PUBLICATIONS

Yue, Alex, Automated Receipt Image Identification, Cropping, and Parsing, Princeton University, dated Nov. 30, 2017 (Year: 2017).*
Blog, "Automating Reciept Processing using Machine Learning", ryubidragonfire.github.io/blog, dated Jun. 6, 2017. (Year: 2017).*
Dries Buytaert, "Shopping with augmented reality", Acquia Think Ahead, Oct. 26, 2017, https://dri.es/shopping-with-augmented-reality, 6 pages.

* cited by examiner

AUGMENTED PROJECT LISTS WITH PRICE INFORMATION

BACKGROUND

Businesses and individuals may use project lists for various purposes. For example, a manufacturer may create a bill of materials that lists the materials and parts needed to manufacture an end product. As another example, a cook may create and use recipes, which typically include a list of the required ingredients. As yet another example, shoppers may create grocery lists or other shopping lists before they go shopping. Project lists may be prepared using standardized forms, typed out, or hand written. Many project lists do not include price information. For example, recipes typically include the name and quantity of each required ingredient, but not ingredient price information.

Businesses and individuals may adhere to a budget that accounts for mandatory expenses as well as discretionary spending. For example, a person's weekly, bi-weekly, or monthly budget may account for essentials, such as rent, groceries, utilities, taxes, and retirement savings. The person's remaining income after deducting for essential expenses is sometimes referred to as their "disposable income." Failing to accurately track purchases or to consider how a particular purchase will impact a person's budget can lead to overdraft fees, interest charges, and poor credit ratings.

SUMMARY

According to one aspect of the present disclosure, a method for augmenting project lists with price information includes: capturing an image using a camera of a user device; identifying a project list within the captured image; extracting, from the captured image, a list of items associated with the project list, the list of items represented as text; retrieving price information for one or more of the list items; and displaying, on the user device, an augmented image including the captured image and the price information.

In some embodiments, the method can include, for the one or more list items, positioning the corresponding price information proximate to the corresponding list item within the augmented image. In some embodiments, the method may include calculating a total price for the project list using the retrieved price information, wherein the augmented image includes the total price. In some embodiments, the method can include positioning the total price proximate to the project list within the augmented image. In some embodiments, the method may include identifying negative space within the captured image and positioning the total price over the negative space within the augmented image. In some embodiments, the method may include: displaying, on the user device, user interface controls to remove items from the project list; and in response to the user removing an item from the project list, updating the total price for the project list within the augmented image.

In some embodiments, identifying the project list within the captured image can include identifying a recipe within the captured image, wherein retrieving the price information includes retrieving the prices for one or more ingredients. In some embodiments, identifying the project list within the captured image can include identifying a grocery list within the captured image, wherein retrieving the price information includes retrieving the prices for one or more grocery items. In some embodiment, identifying a project list within the captured image may include using computer vision (CV), wherein extracting the list of items associated with the project list includes using natural language processing (NLP). In some embodiments, the method may include selecting a machine learning (ML) model based on a project type associated with the project list, wherein the using CV or NLP includes using the selected ML model. In some embodiments, retrieving the price information for the one or more list items may include retrieving item data from a database.

In some embodiments, the method may include determining a preferred vendor associated with a user of the user device, wherein retrieving the price information for the one or more list items includes retrieving price information associated with the preferred vendor. In some embodiments, the method may include: displaying, on the user device, one or more user interface controls for modifying user preferences, wherein the user preferences include at least the user's preferred vendor; and in response to the user modifying the user preferences, sending the user preferences to a server device, the server device configured to store the user preferences in a database. In some embodiments, the method may include: determining a disposable income budget for a user of the user device; and calculating a relative cost of the project list using the disposable income budget, wherein the augmented image includes the relative cost of the project list.

According to another aspect of the present disclosure, a method for augmenting price tags, the method may include: capturing an image using a camera of a user device; identifying a price tag within the captured image; extracting, from the captured image, price information associated with the price tag, the price information represented as text; determining a disposable income budget for a user of the user device; calculating a relative cost associated with the price tag using the price information and the disposable income budget; and displaying, on the user device, an augmented image including the captured image and the relative cost associated with the price tag.

In some embodiments, determining the disposable income budget for the user can include: retrieving, from a bank computer network, account data for the user; determining a periodic budget for the user; determining a spend amount for the user based on the retrieved account data; and calculating the disposable income budget using a periodic budget and the spend amount. In some embodiments, determining the periodic budget for the user includes analyzing the retrieved account data to determine a spending pattern for the user. In some embodiments, determining the spend amount for the user includes identifying, from the account data, transactions associated with discretionary spending. In some embodiments, extracting, from the captured image, price information associated with the price tag includes using computer vision (CV).

According to another aspect of the present disclosure, a server device can include one or more processors, an application programming interface (API) module, and an items module. The API module may be configured for execution on the processors to receive requests from and send responses to a user device. The items module can be configured for execution the processors to: receive, from the user device via the API module, a list of items associated with a project list; retrieve, from a database, price information for the list of items; and send the price information to the user device via the API module. The user device may be configured to: capture an image using a camera of the user device; identify the project list within the captured image; extract, from the captured image, the list of items associated with the project list, the list of items represented as text; and display, on the user device, an augmented image comprising the captured image and the price information.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to a system and methods for augmenting project lists with price information. Users can install an augmented reality (AR) application (or "app") on their device. The AR app can access a camera on the user device to capture images of project lists, such as recipes or shopping lists. Computer vision (CV) and natural language processing (NLP) techniques can be used to identify items within the project list, such as a list of ingredients required for a given recipe. The AR app can communicate with a server device to retrieve price information for the list items. As used herein, the term "item" can refer to any good, product, ingredient, component, or other saleable entity included within a project list. Price information may be stored in a centralized database or retrieved from vendors (e.g., grocery stores) using application programming interfaces (APIs). The app can use the price information to generate and display an augmented version of the project list. For example, the user may see a price next to each of the project list items, along with a total price for the project overlaid onto the captured project list image. Embodiments of the present disclosure can allow businesses and individuals to efficiently determine a project's cost before committing to the project. Embodiments of the present disclosure can improve the efficiency of project planning using, for example by using CV and NLP techniques to augment project lists with contextual price information.

Embodiments of the present disclosure relate to a system and methods for augmenting price tags to show the relative cost of an item as a percentage of a user's disposable income budget. An AR app installed on a user device can capture an image of a price tag. The CV and/or NLP techniques can be used to read price information from the price tag. The app can display, on the user device, an augmented image that includes the relative cost overlaid on the price tag. The user's disposable income budget may be calculated using account data (e.g., savings, checking, and credit card account data) received from a bank computer network. Embodiments of the present disclosure can provide an efficient means for users to determine, in-context if they can afford to purchase particular items and the impact it such purchases would have on their finances.

Figure 1:
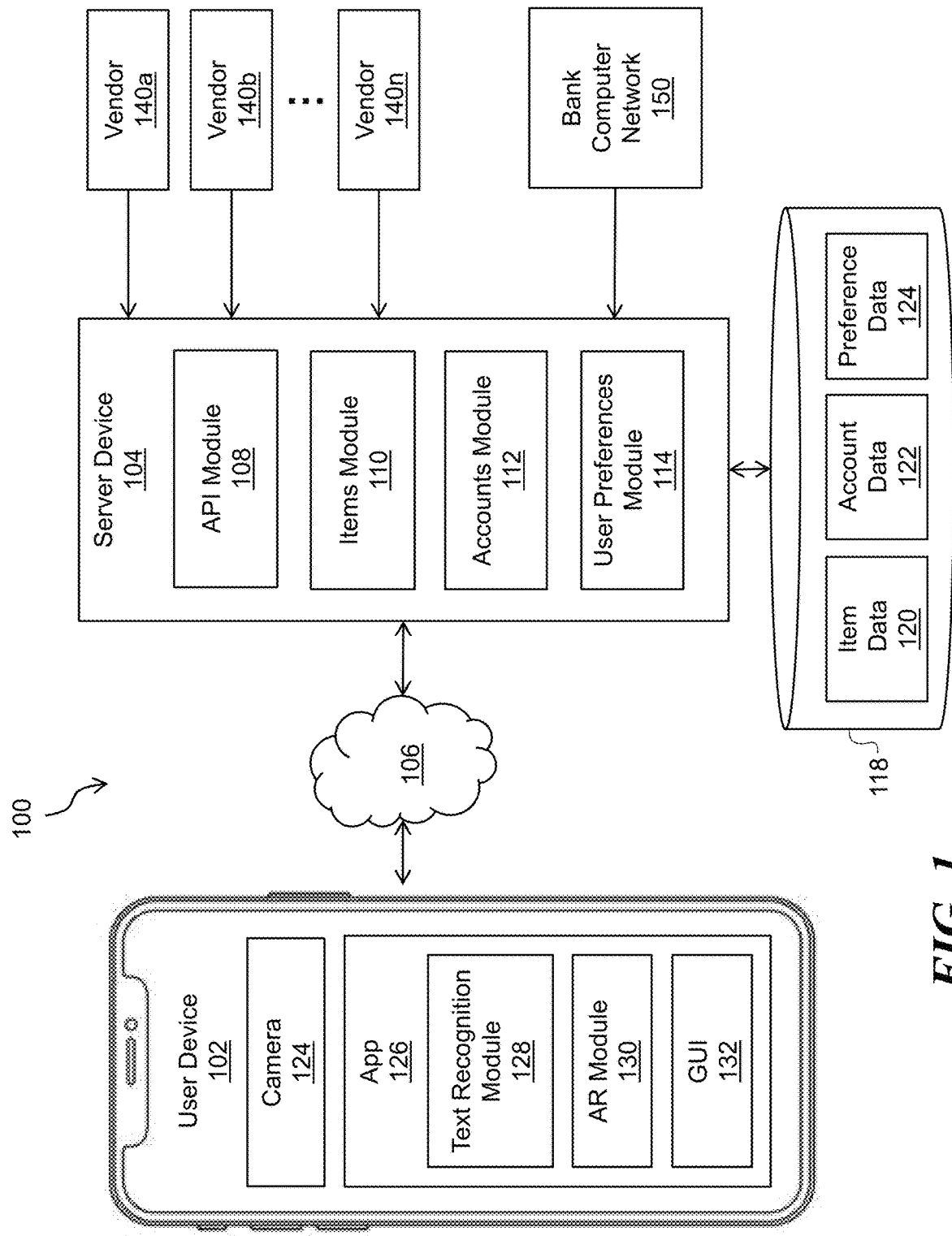
FIG. 1 is a diagram of a distributed system for augmenting project lists with price information, according to some embodiments of the present disclosure.

FIG. 1 is a diagram of a system for augmenting project lists with price information, according to some embodiments of the present disclosure. Illustrative system 100 can include one or more user devices 102 in communication with a server device 104 via a network 106. To promote clarity in the drawings, only one user device 102 is shown in FIG. 1, however, a skilled artisan will understand that the system described herein can be extended to support an arbitrary number of user devices 102 communicating with one or more server devices 104.

Server device 104 can include API module 108, items module 110, accounts module 112, and user preferences module 114, as shown in FIG. 1. Each of the modules 108-114 may include hardware and/or software configured to perform the processing described herein below. Server device 104 can include or otherwise access a database 118. Database 118 can be configured to store, for example, item data 120, account data 122, and preference data 124.

Server device 104 can receive item data from one or more vendor computer systems 140a, 140b, . . . , 140n (140 generally). In some embodiments, vendor computer systems 140 can e-commerce websites and APIs, such as online grocery stores and home improvement store websites. Server device 104 can also receive account data from one or more bank computer networks 150, including savings, checking, and credit card account data.

API module 108 can be configured to receive requests from user devices 102, delegate processing of the requests to other modules within the server device 104, and send corresponding responses back to the user devices 102. For example, API module 108 may be configured to receive requests for price information from an app 126 running on user device 102 and forward these requests to the items module 110 for processing. As another example, API module 108 may be configured to receive requests to manage user preferences and forward these requests to the user preferences module 114 for processing.

In some embodiments, API module 108 may provide a RESTful API that can accessed by user devices 102. In some embodiments, API module 108 may receive requests and/or generate responses that include JavaScript Object Notation (JSON) data. A skilled artisan will understand that other API formats can be used within the system.

Items module 110 may be configured to manage item data 120 stored within database 118. In some embodiments, items module 110 can receive item data from one or more vendor computer systems 140, for example by accessing e-commerce websites or APIs. In some embodiments, items module 110 can periodically download item data from a third party computer using, for example, File Transfer Protocol (FTP). In some embodiments, each vendor's item data may be physically or logically separated within the database 118. The stored item data 120 can include, for each of a plurality of items, a vendor identifier, an item identifier, and price information. For a given product, stored item data 120 may include multiple prices. Price information may include a per-unit price and/or weight- or volume-based pricing. The vendor identifier can be an identifier, unique within the context of system 100, that denotes which vendor 140 the item data was received. The item identifier can uniquely identifies the item within the context of the vendor. In some embodiments, the item identifier can include, for example, a descriptive name or numerical identifier (e.g., SKU) used by the vendor.

Items module 110 may be configured to search for, and retrieve, information about particular items. For example, a user device 102 may send a request to server device 104 to retrieve price information for a list of items (e.g., recipe ingredients). The request may include a descriptive name for each item (e.g., "flour," "eggs," and "milk"). The request may be handled by items module 110, which can match the item names against item data 120 and retrieve corresponding price information. In some embodiments, the request may specify a particular vendor to search. In some embodiments, items module 110 is capable of performing approximate or "fuzzy" string matching to locate and retrieve item price information.

Accounts module 112 may be configured to manage account data 122 stored within database 118. In some embodiments, accounts module 112 can receive account data from one or more bank computer networks 150. Bank computer network 150 may correspond to a computer network owned and/or operated by a financial institution (e.g., CAPITAL ONE™). Bank computer network 150 can include one or more interconnected physical and/or virtual server devices. In some embodiments, server device 104 may communicate with bank computer network 150 via a physical or virtual private network operated by a financial institution. In some embodiments, server device 104 may form a part of bank computer network 150 or otherwise be hosted by a financial institution that provides the disclosed functionality to its customers. In some embodiments, accounts module 112 may receive, for individual users, a list of credit and debit transactions for a given time period. In some embodiments, accounts module 112 can receive aggregate account data from bank computer network 150, such as a current account balance, total spend in the past thirty days, etc. Accounts module 112 can store transaction-level or aggregate account data 122 in database 118.

In some embodiments, accounts module 112 can calculate a user's disposable income budget using bank account data. For example, a user's disposable income budget may be calculated based on the user's regular income, as indicated by recurring deposit transactions, and based on their average spend within different categories of spending, such as restaurants, movies, concerts, etc. In some embodiments, the user's credit card balances may be used to calculate their disposable income budget. In some embodiments, the user's may manually enter their disposable income budget within the system 100. A user device 102 may retrieve a user's disposable income budget and/or other bank account data for the user by sending a request to accounts module 112 via API module 108.

User preferences module 114 may be configured to manage user preference data 124 stored within database 118. In some embodiments, user preference data 124 can include, for each of a plurality of users, the user's preferred vendors 140 (e.g., preferred grocery store). In some embodiments, user preference data 124 can indicate when particular users have a preference for a particular quantity of items, such as a preference for organic groceries. User preferences module 114 can provide user preference data to user devices 102 in addition to other modules within the server device 104. For example, when items module 110 retrieves price information for a particular user, it may consult user preferences module 114 to determine the user's preferred vendor(s) and use this preference data to determine which vendor's item data to query within the database. In some embodiments, a user's preferred vendor(s) can be determined using information collected for previous orders. In some embodiments, the user's preferred vendors may be determined based on user input/selection.

In some embodiments, server device 104 and/or database 118 may be part of bank computer network 150. In such embodiments, server device 104 may directly access account data stored within bank computer network 150.

User devices 102 can include, smartphones, tablet computers, laptop computers, smart watches, and other mobile and wearable devices. As shown in FIG. 1, in some embodiments a user device 102 can include a camera 124 (among other hardware components) and one or more apps, such as app 126. The illustrative app 126 can include a text recognition module 128, an augmented reality (AR) module 130, and a graphical user interface (GUI) 132.

Figure 2B:
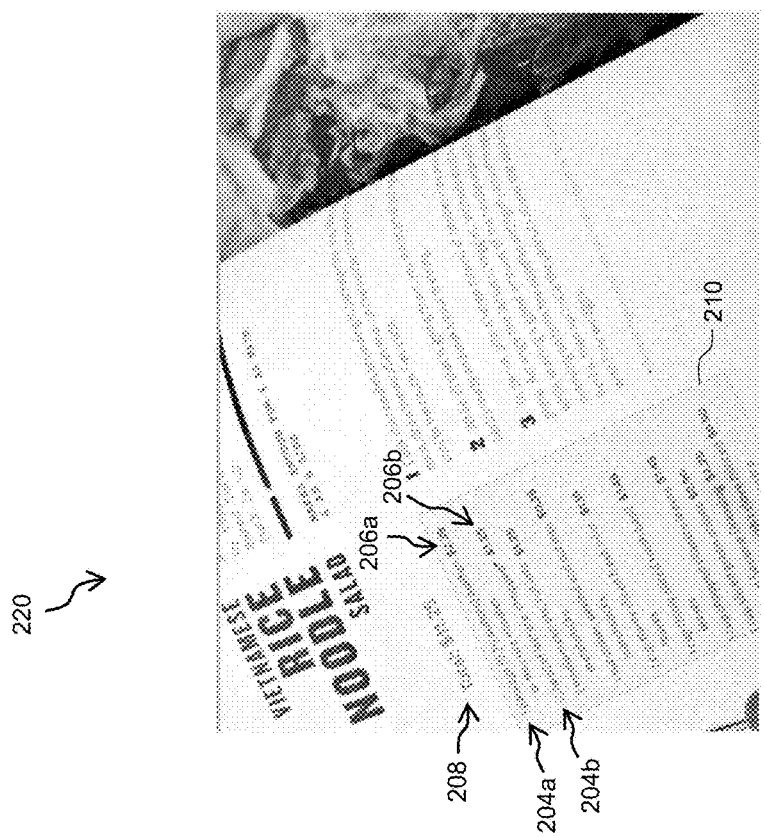
FIGS. 2A and 2B illustrate an augmented project list, according to some embodiments of the present disclosure.
Figure 2A:
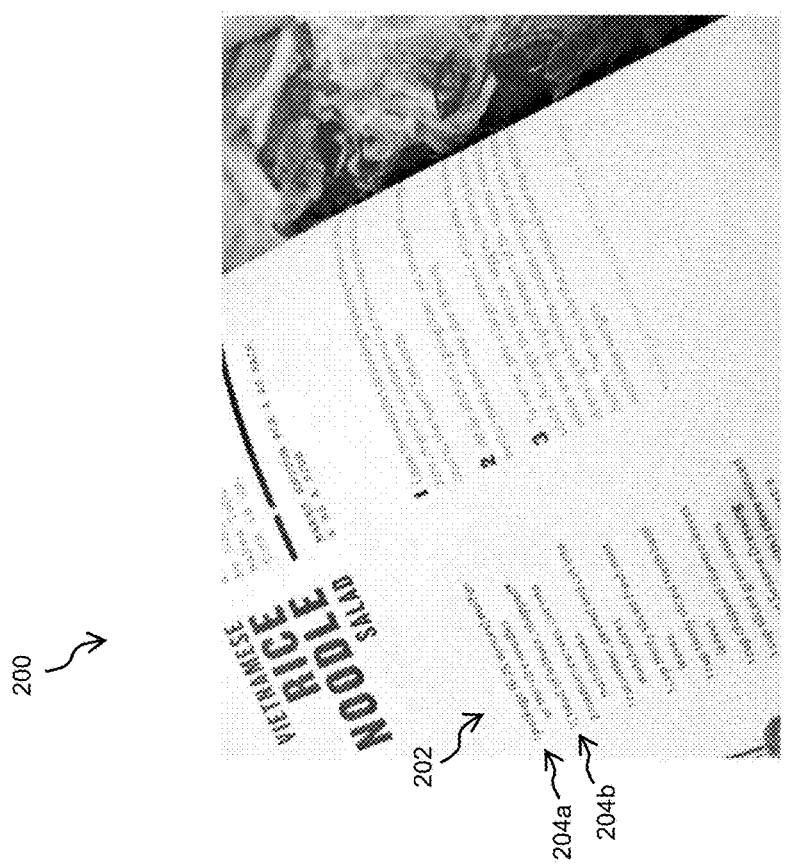

In some embodiments, app 126 may include augment reality (AR) capabilities and be configured to augment project lists with price information. FIGS. 2A and 2B illustrates AR capabilities of the app 126, according to some embodiments. The AR app 126 can access camera 124 to capture images of project lists, such as recipes, grocery lists, or bills of materials. In some embodiments, camera 124 can continuously capture image data, e.g. as video stream, and the app 126 can, on a periodic or intermittent basis, sample the continuous data to obtain still images suitable for processing using the techniques disclosed herein. In some embodiments, the app 126 may provide a button or other user control which the user can touch to capture a still image of a project list, which the app 126 can they augment. In some embodiments, the app 126 can augment previously-taken images of project lists stored in the user device 102 or in cloud-based storage.

Text recognition module 128 may be configured to use CV and/or NLP techniques to identify a project list within an image and to generate a textual representation of the individual items set forth in the project list. In some embodiments, module 128 can use optical character recognition (OCR) to convert image data to textual data. For each list item detected in the image, text recognition module 128 may output (a) a string of alphanumeric characters corresponding to a descriptive item name, (b) a numeric value corresponding to the quantity of that item, (c) a value indicating the units in which the quantity is expressed. For example, when analyzing a recipe, module 128 could generate information such as shown in TABLE 1. In some embodiments, app 126 can convert item quantities into standard units.

TABLE 1

| Item | Quantity | Units |
| --- | --- | --- |
| Flour | 2 | Cups |
| Eggs | 3 | Each |
| Milk | 16 | Ounces |

Text recognition module 128 may be configured to use one or more machine learning (ML) models for text recognition. The models can be trained to recognize text within different categories of project lists. For example, module 128 may use a particular ML model trained for recipes, and a different ML model trained for home improvement projects. In some embodiments, the accuracy of particular ML models is improved over time based on user feedback. For example, app 126 may include UI controls that enable a user to indicate when AR-related information displayed by the app 126 is inaccurate or irrelevant to the user. As the accuracy of particular ML models is improved over time, the module 128 may identify categories of items that are commonly found together and select the most appropriate model for a particular item group. In some embodiments, module 128 may utilize multiple different models for a single project list (e.g., if the project list includes a distinctive group of items).

App 126 can send a request to server device 104 to retrieve price information for the list of items in the project list. The request may include the descriptive name of each item, along with the quantity and units for each item. App 126 may use the price information to generate an augmented version of the project list displayed via GUI 132. The augmented image may include a price for each of the list items, along with a total price for the project list. In some embodiments, app 126 may utilize an AR toolkit provided as part of the user device's operating system. For example, on IOS devices such as IPADS and IPHONES, app 126 may use ARKit to superimpose price information onto an image of a project list. In some embodiments, app 126 may automatically store augmented project list images to the user device 102 or cloud-based storage. In some embodiments, GUI 132 can include a user control for selectively storing augmented project list images.

In some embodiments, GUI 132 may allow a user to remove items from the augmented project list using a touch gesture, such as by sliding a finger across the item. In response, the app 126 can re-calculate the total price of the project list and update the augmented image accordingly. In some embodiments, app 126 may provide links to vendor websites where the user can purchase items in the project list. For example, in response to the user clicking/touching a list item, app 126 may direct the user the vendor website where they can purchase the list item. In some embodiments, app 126 may make suggestions of vendor websites based on price, for example. The app 126 may also suggest a physical location based on location of the user/device and/or best price, etc.

In some embodiments, GUI 132 may include one or more controls to change user preferences. For example, GUI 132 may include controls for selecting the user's preferred vendors 140. In response to the user changing one of their preferences, GUI 132 may send a request to user preferences 114 module, which in turn updates user preferences data 124 in database 118.

In some embodiments, app 126 may display price information relative to the user's disposable income budget. For example, app 126 may display the price of each list item, or the total price of the list, as a percentage of the user's disposable income budget for the current week, month, etc. App 126 may retrieve the user's disposable income budget from server device 104 and, in particular, from accounts module 112. In some embodiments, GUI 132 may present controls that allow a user to manually enter their disposable income budget.

In some embodiments, app 126 may display the price of items relative to the user's past spending behavior. For example, app 126 may display the total cost of a recipe relative to the average amount the user spends on takeout or at restaurants. As another example, app 126 may display the total cost of a recipe relative to the user's average daily spend on food. In some embodiments, app 126 may retrieve menu pricing data from restaurants using, for example, APIs provided by third party services such as YELP or GOOGLE. App 126 can display a comparison of the cost of preparing a recipe versus ordering a similar meal at one or more restaurants.

In some embodiments, app 126 may recommend other recipes or projects based on the items in a scanned project list. For example, app 126 may access a database of project lists and compare the list items with the scanned list, determining how similar the items are in the two different project lists. In some embodiments, the system 100 may crowdsource data across multiple users to determine which recipes or ingredients are trending, and app 126 may display the tending recipes/ingredients.

In some embodiments, app 126 may be an AR app configured to "read" price tags and augment the price tags based on the user's disposable income budget. For example, a user can point their device's camera 124 at a price tag that includes a dollar amount, and the app 126 can show an augmented version of the price tag that displays the dollar amount as a percent of the user's remaining disposable income for the current week, month, etc. App 126 can use text recognition module 128 to identify, from image data, price information and to generate a numeric value (e.g., a dollar amount) representing the item's price.

FIGS. 2A and 2B illustrate an augmented project list, according to some embodiments of the present disclosure. In the example of FIGS. 2A and 2B, the project list corresponds to a recipe. A skilled artisan will understand that the systems and methods sought to be protected herein can be used with many different types of project lists and are not limited to recipes.

Referring to FIG. 2A, an image 200 may be captured by a camera within a user device, such as camera 124 in FIG. 1. The image 200 includes a project list (i.e., recipe) 202 having a plurality of items (i.e., ingredients) 204a, 204b, etc. (202 generally). To promote clarity in the drawings, only the first two items 204a, 204b are labeled. An app running on the user device (e.g., app 126 in FIG. 1) may use CV and/or NLP techniques to identify the project list 202 within the image 200 and to generate a textual representation for each of the list items 204. In some embodiments, the app may generate, for each list item, a descriptive name of the item, a quantity value, and units indicator. The app may send the list of items to a server device (e.g., server device 104 in FIG. 1) and, in response, receive price information for each of the list items.

Referring to FIG. 2B, the app may generate an augmented image 220 that includes the original image 200 (FIG. 2A) overlaid or otherwise augmented with the received price information. For example, as shown in FIG. 2B, a plurality of prices 206a, 206b, etc. may be overlaid onto the image 220, each price positioned near a corresponding one of the list items 204a, 204b, etc. The positioning of the displayed price information may be determined using OCR or other CV techniques. A total price 208 for the project list may also be added to the image and positioned, for example, above the project list. In some embodiments, a border 210 may be added to call attention to the augmented project list, as shown in FIG. 2B. In some embodiments, the app may use one or more layout strategies to determine where to position the price information relative to the captured image. For example, as shown in FIG. 2, the app may identify negative space (sometimes referred to as "white space" or "blank space") proximate to each list item 204, and position the price information 206 within that negative space. The position and dimensions of negative space can be identified using OCR or other CV techniques. In some embodiments, if no suitable layout can be found within the captured image, the app may display price information on a separate screen from the image 220.

In some embodiments, the app may allow a user to remove an item 204 from the augmented project list using a gesture, such as by swing across the list item. In some embodiments, when a user clicks on a list item 204, the app may direct the user to a vendor website or app where the user can purchase the item.

Figure 3:
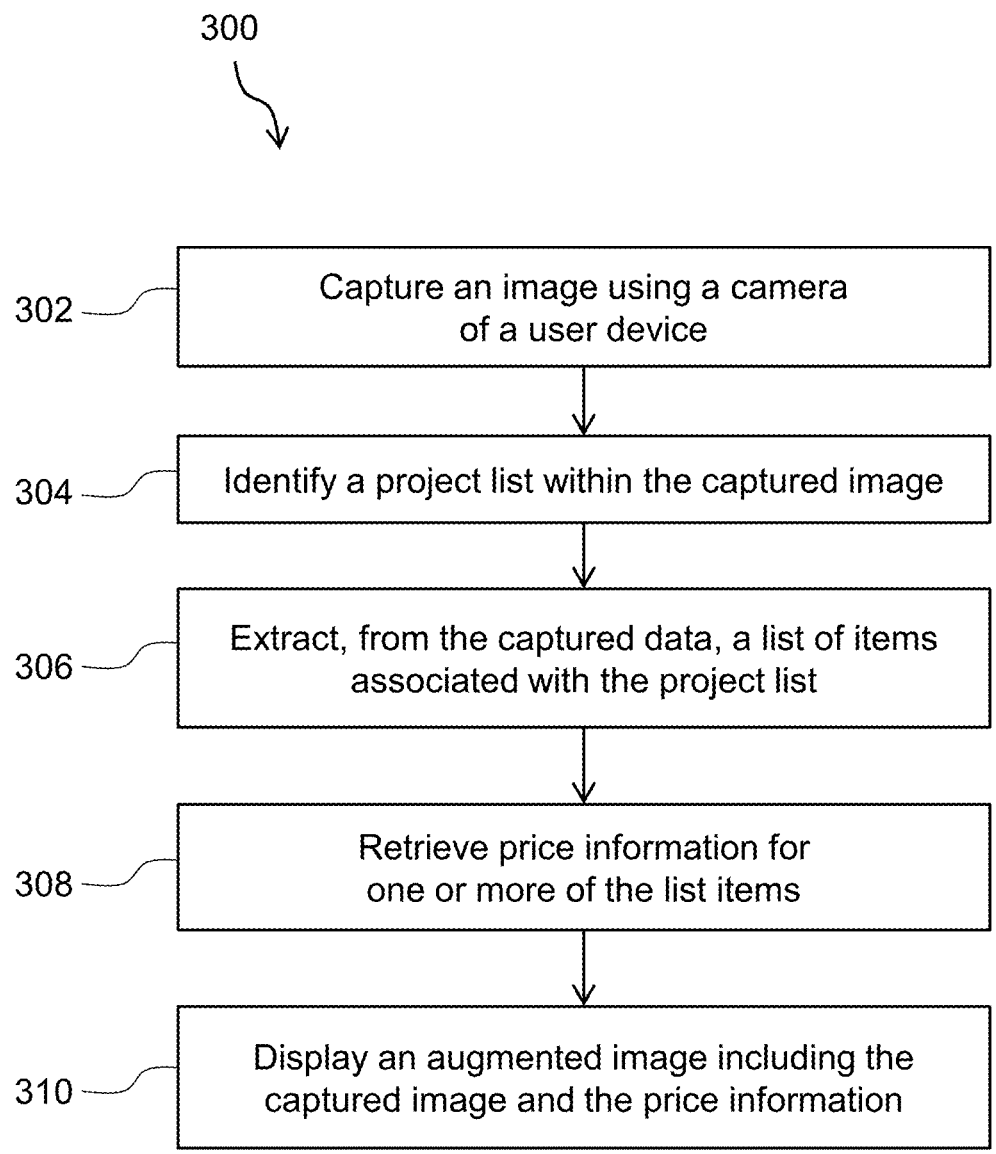
FIG. 3 is a flow diagram showing a method for augmenting project lists with price information, according to some embodiments of the present disclosure.

FIG. 3 illustrates a method 300 for augmenting project lists with price information, according to some embodiments of the present disclosure. In some embodiments, method 300 may be implemented by an app configured to run on a user device, such as app 126 of FIG. 1.

At block 302, an image may be captured using a camera of a user device. In some embodiments, the camera can continuously capture image data and the can app, periodically, automatically sample the image data and perform the processing described herein.

At block 304, a project list can be identified within the captured image. In some embodiments, OCR or other CV techniques may be used to identify the project list. At block 306, a list of items associated with the project list can be extracted from the captured image. The list of items may be represented as text. In some embodiments, natural language processing (NLP) may be used to generate text for the list of items. In some embodiments, a machine learning (ML) model may be selected based on a project type associated with the project list, and the model may be used for CV and/or NLP. For example, ML models may be trained for particular types of project lists (e.g., grocery lists versus home improvement project lists) and the app may select the best model to use for a particular project list.

At block 308, price information may be retrieved for one or more of the list items. In some embodiments, the user device sends a request for price information to a server device (e.g., server device 104 in FIG. 1). The price information may be based on data received from one or more vendor computer systems, such as vendors 140 in FIG. 1. In some embodiments, price data may be stored within a database coupled to the server device (e.g., database 118 in FIG. 1). For a particular list item, there may be several suitable products (or "options") available from one or more different vendors. For example, a grocery store may have many options for flour in a range of prices based on brand, size/quantity, features (organic vs. conventional), promotions, etc. In some embodiments, a system (e.g., system 100 of FIG. 1) can use machine learning (ML) to select an option for a user based, for example, on the user's purchasing history (e.g., using account data 122), the user's preferences (e.g., preferences data 124 of FIG. 1), and feedback data previously received from the user. In some embodiments, the system may present a user interface (UI) where the user can choose from a list of options. In some embodiments, the system may select an option that has an average/median price of all options. In some embodiments, the system may select an option that is the most popular option among users of the system.

At block 310, an augmented version of the project list may be displayed on the user device. The augment image may include the captured image overlaid with, or otherwise augmented with, the price information. In some embodiments, the price information for individual project list items may be positioned proximate to those list items within the augmented image.

In some embodiments, a total price for the project list may be added to the augmented image. The total price may be calculated, for example, within the app based on the retrieved price information. The total price may be displayed in a position that is proximate to the project list within the augmented image. In some embodiments, the total price of the project list may be shown relative to the user's disposable income budget, for example as a percentage of the user's disposable income budget. The user's disposable income budget can be determined using account data received from a bank computer network. In some embodiments, the app may identify negative space within the captured image and position the augmented price information over the negative space to enhance the clarity and legibility of the augmented price list.

Figure 4:
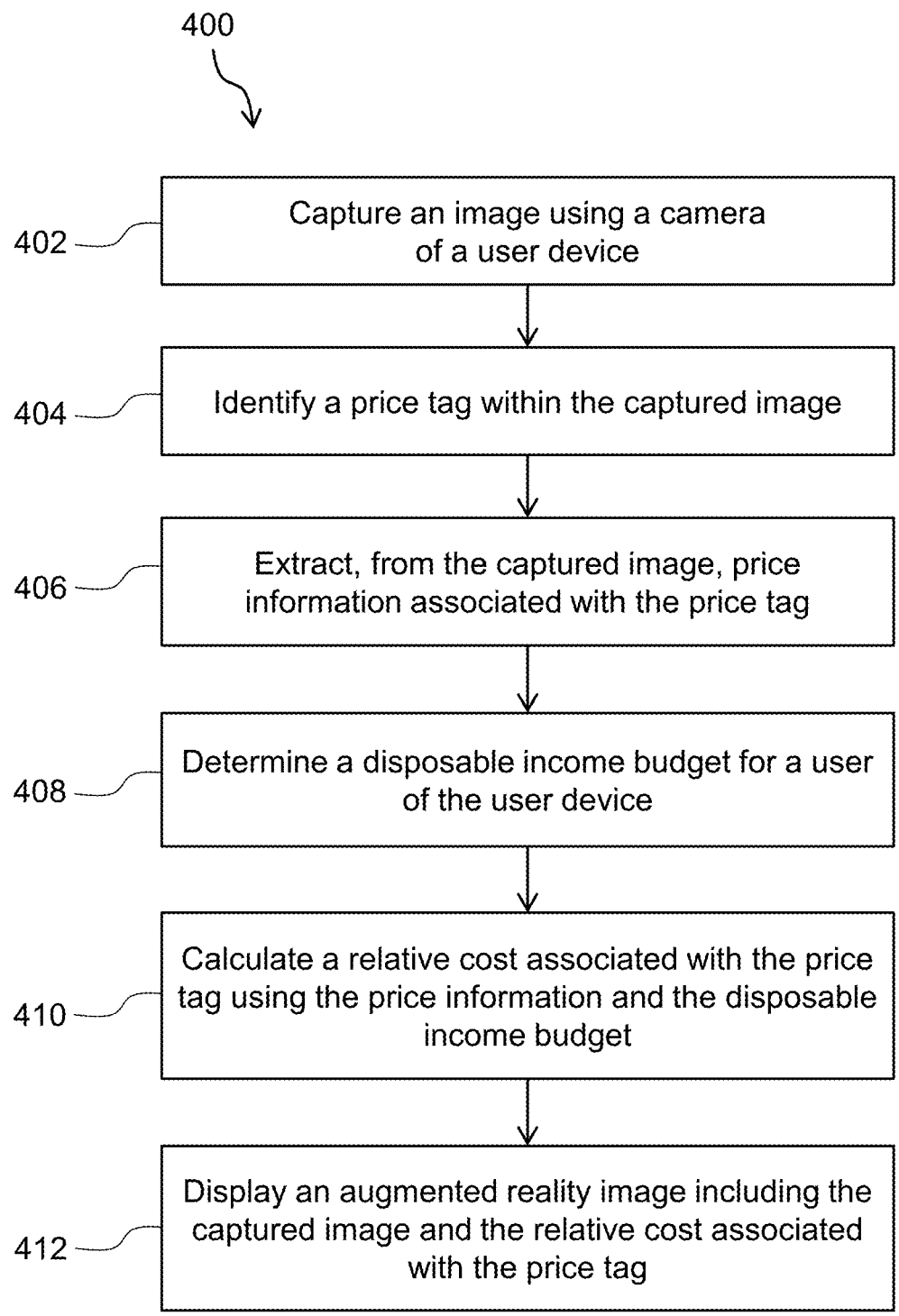
FIG. 4 is a flow diagram showing a method for augmenting price tags, according to some embodiments of the present disclosure.

FIG. 4 illustrates a method 400 for augmenting price tags to show the cost of an item as a percentage of a user's disposable income, according to some embodiments of the present disclosure. In some embodiments, method 400 may be implemented by an app configured to run on a user device, such as app 126 of FIG. 1.

At block 402, an image can be captured using a camera of a user device. In some embodiments, the camera can continuously capture image data and the can app, periodically, automatically sample the image data and perform the processing described herein.

At block 404, a price tag can be identified within the captured image. In some embodiments, OCR or other CV techniques may be used to identify the price tag. At block 406, price information associated with the price tag can be extracted from the captured image. In some embodiments, a price (e.g., a dollar amount) may be read directly from the price tag. In other embodiments, an SKU or other item identifier may be read from the price tag and used to retrieve price information, such as from a merchant's inventory management system.

At block 408, a disposable income budget is determined for a user of the user device. The user's disposable income budget can be determined using account data received from a bank computer network. For example, the account data may be analyzed to determine a spend amount for the user, and this spending amount may be subtracted from the user's periodic budget, such as their monthly or weekly budget. At block 410, a relative cost associated with the price tag may be calculated using the price information and the disposable income budget.

At block 412, an augmented version of the captured image may be displayed on the user device. The augmented image can include the captured image overlaid with, or otherwise augmented with, the relative cost associated with the price tag.

Figure 5:
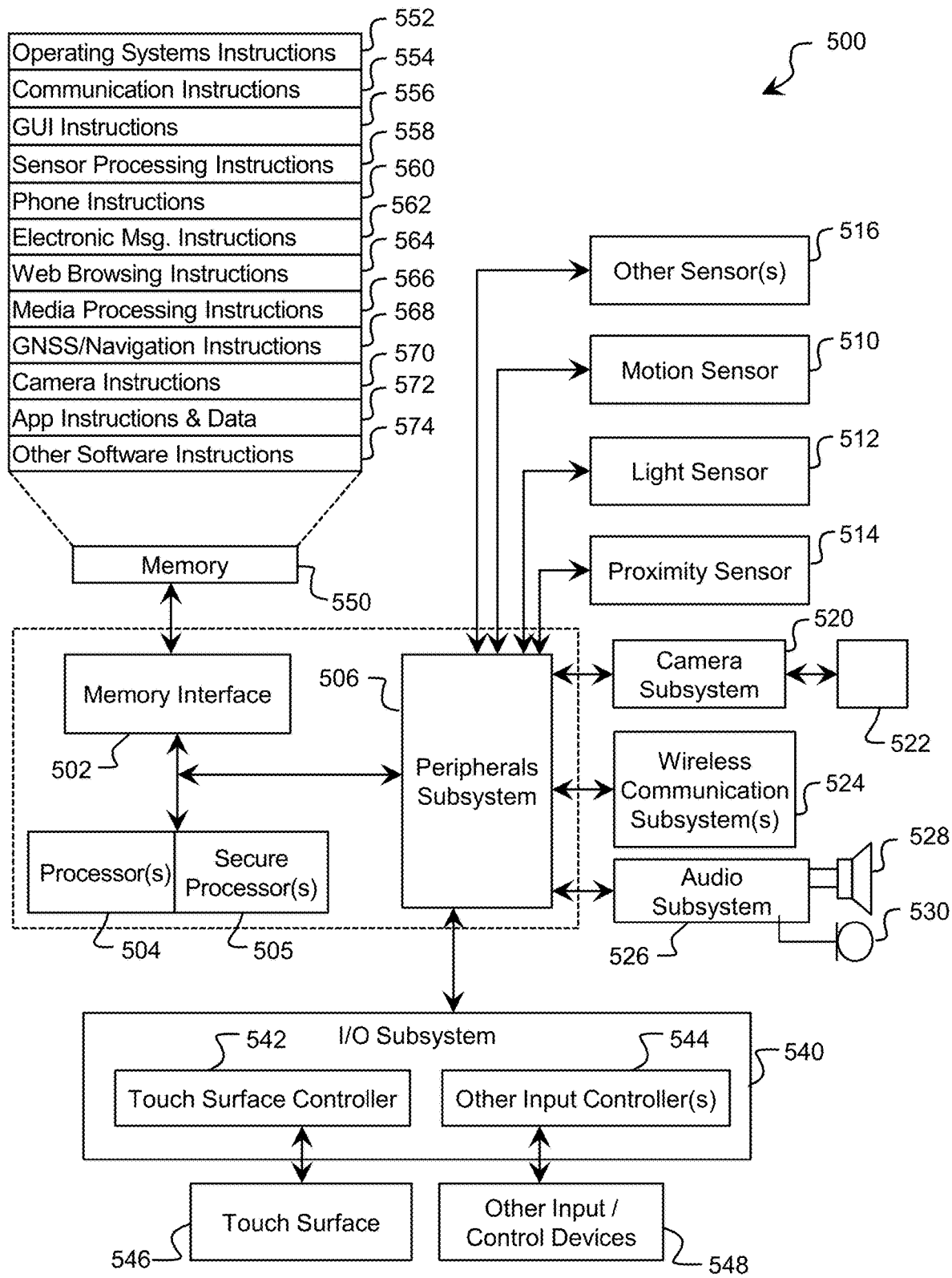
FIG. 5 is a block diagram of a user device, according to some embodiments of the present disclosure.

FIG. 5 shows a user device 500, according to an embodiment of the present disclosure. The illustrative user device 500 may include a memory interface 502, one or more data processors, image processors, central processing units 504, and/or secure processing units 505, and a peripherals interface 506. The memory interface 502, the one or more processors 504 and/or secure processors 505, and/or the peripherals interface 506 may be separate components or may be integrated in one or more integrated circuits. The various components in the user device 500 may be coupled by one or more communication buses or signal lines.

Sensors, devices, and subsystems may be coupled to the peripherals interface 506 to facilitate multiple functionalities. For example, a motion sensor 510, a light sensor 512, and a proximity sensor 514 may be coupled to the peripherals interface 506 to facilitate orientation, lighting, and proximity functions. Other sensors 516 may also be connected to the peripherals interface 506, such as a global navigation satellite system (GNSS) (e.g., GPS receiver), a temperature sensor, a biometric sensor, magnetometer, or another sensing device, to facilitate related functionalities.

A camera subsystem 520 and an optical sensor 522, e.g., a charged coupled device (CCD) or a complementary metal-oxide semiconductor (CMOS) optical sensor, may be utilized to facilitate camera functions, such as recording photographs and video clips. The camera subsystem 520 and the optical sensor 522 may be used to collect images project lists and price tags which can then be augmented with price information using techniques disclosed herein.

Communication functions may be facilitated through one or more wired and/or wireless communication subsystems 524, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 524. The specific design and implementation of the communication subsystems 524 may depend on the communication network(s) over which the user device 500 is intended to operate. For example, the user device 500 may include communication subsystems 524 designed to operate over a GSM network, a GPRS network, an EDGE network, a WiFi or WiMax network, and a Bluetooth™ network. For example, the wireless communication subsystems 524 may include hosting protocols such that the device 500 can be configured as a base station for other wireless devices and/or to provide a WiFi service.

An audio subsystem 526 may be coupled to a speaker 528 and a microphone 530 to facilitate voice-enabled functions, such as speaker recognition, voice replication, digital recording, and telephony functions. The audio subsystem 526 may be configured to facilitate processing voice commands, voiceprinting, and voice authentication, for example.

The I/O subsystem 540 may include a touch-surface controller 542 and/or another input controller (s) 544. The touch-surface controller 542 may be coupled to a touch surface 546. The touch surface 546 and touch-surface controller 542 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of the speaker 528 and/or the microphone 530.

In some implementations, a pressing of the button for a first duration may disengage a lock of the touch surface 546; and a pressing of the button for a second duration that is longer than the first duration may turn power to the user device 500 on or off. Pressing the button for a third duration may activate a voice control, or voice command, a module that enables the user to speak commands into the microphone 530 to cause the device to execute the spoken command. The user may customize a functionality of one or more of the buttons. The touch surface 546 can, for example, also be used to implement virtual or soft buttons and/or a keyboard.

In some implementations, the user device 500 may present recorded audio and/or video files, such as MP3, AAC, and MPEG files. In some implementations, the user device 500 may include the functionality of an MP3 player, such as an iPod™. The user device 500 may, therefore, include a 36-pin connector and/or 8-pin connector that is compatible with the iPod. Other input/output and control devices may also be used.

The memory interface 502 may be coupled to memory 550. The memory 550 may include high-speed random access memory and/or non-volatile memory, such as one or more magnetic disk storage devices, one or more optical storage devices, and/or flash memory (e.g., NAND, NOR). The memory 550 may store an operating system 552, such as Darwin, RTXC, LINUX, UNIX, OS X, WINDOWS, or an embedded operating system such as VxWorks.

The operating system 552 may include instructions for handling basic system services and for performing hardware dependent tasks. In some implementations, the operating system 552 may be a kernel (e.g., UNIX kernel). In some implementations, the operating system 552 may include instructions for performing voice authentication.

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions. Memory 550 may store app instructions and data 572, such as instructions and data used by app 126 of FIG. 1.

Each of the above-identified instructions and applications may correspond to a set of instructions for performing one or more functions described herein. These instructions need not be implemented as separate software programs, procedures, or modules. The memory 550 may include additional instructions or fewer instructions. Furthermore, various functions of the user device 500 may be implemented in hardware and/or in software, including in one or more signal processing and/or application specific integrated circuits.

In some embodiments, processor 504 may perform processing including executing instructions stored in memory 550, and secure processor 505 may perform some processing in a secure environment that may be inaccessible to other components of user device 500. For example, secure processor 505 may include cryptographic algorithms on board, hardware encryption, and physical tamper proofing. Secure processor 505 may be manufactured in secure facilities. Secure processor 505 may encrypt data/challenges from external devices. Secure processor 505 may encrypt entire data packages that may be sent from user device 500 to the network. Secure processor 505 may separate a valid user/external device from a spoofed one, since a hacked or spoofed device may not have the private keys necessary to encrypt/decrypt, hash, or digitally sign data, as described herein.

Figure 6:
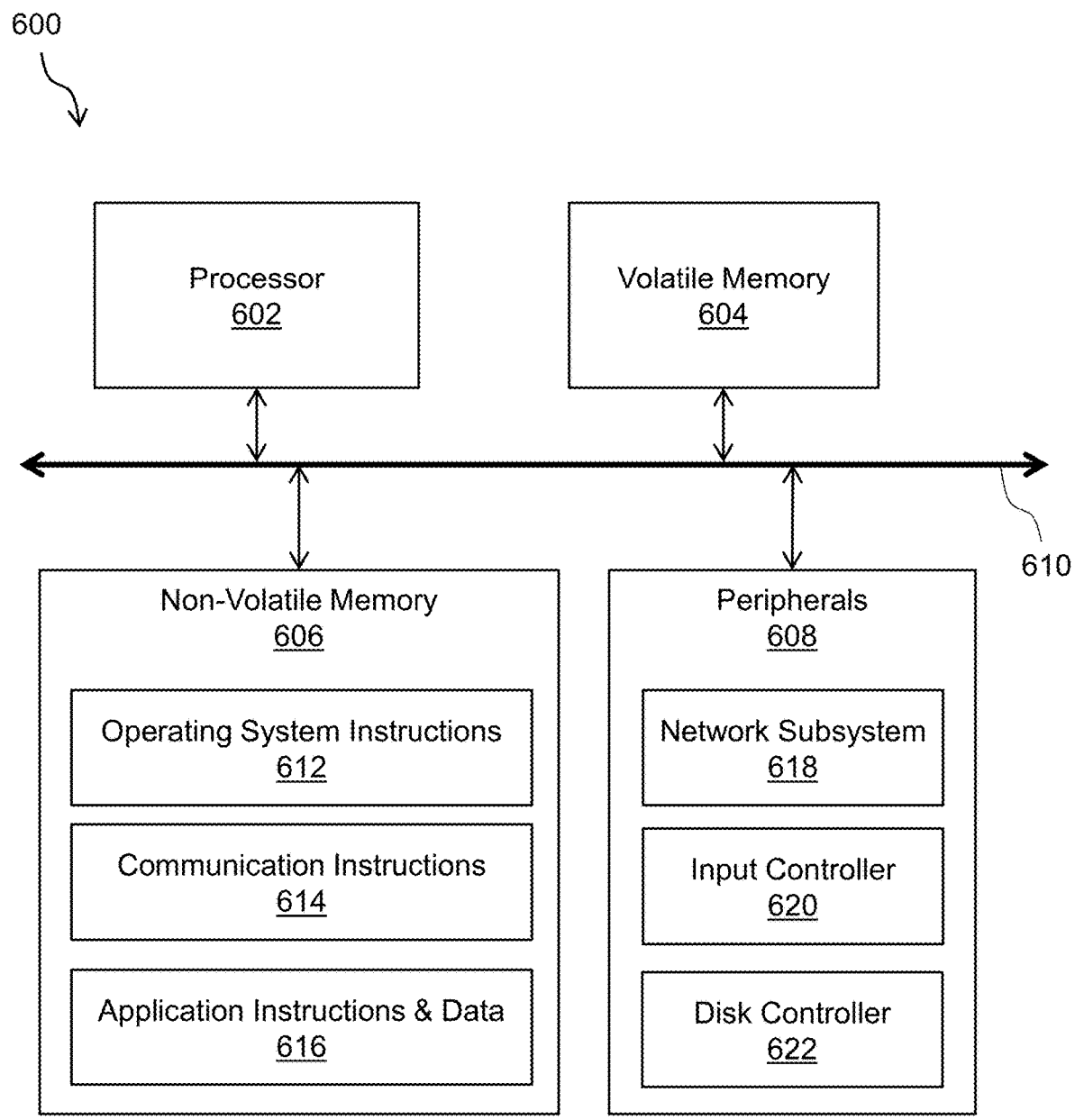
FIG. 6 is a block diagram of a server device, according to some embodiments of the present disclosure.

FIG. 6 shows an illustrative server device 600 that may implement various features and processes as described herein. The server device 600 may be implemented on any electronic device that runs software applications derived from compiled instructions, including without limitation personal computers, servers, smart phones, media players, electronic tablets, game consoles, email devices, etc. In some implementations, the server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, application instructions 616, and application data 617. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc. In some embodiments, application instructions and data 616 can include instructions and data corresponding to modules 108-114 described above in the context of FIG. 1.

Peripherals 608 may be included within the server device 600 or operatively coupled to communicate with the server device 600. Peripherals 608 may include, for example, network interfaces 618, input devices 620, and storage devices 622. Network interfaces may include for example an Ethernet or WiFi adapter. Input devices 620 may be any known input device technology, including but not limited to a keyboard (including a virtual keyboard), mouse, trackball, and touch-sensitive pad or display. Storage devices 622 may include one or more mass storage devices for storing data files; such devices include magnetic disks, such as internal hard disks and removable disks; magneto-optical disks; and optical disks.

Methods described herein may represent processing that occurs within a system . . . (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for augmenting project lists with price information, the method comprising:
   capturing an image using a camera of a user device;
   identifying a project list within the captured image using computer vision (CV), by:
      selecting a first machine learning (ML) model based on a project type associated with the project list; and
      applying the CV to the project list, wherein the CV comprises the selected first ML model;
   extracting from the captured image, using natural language processing (NLP), a list of items associated with the project list, the list of items represented as text, by:
      selecting a second machine learning (ML) model based on the project type associated with the project list; and
      applying the NLP to the project list, wherein the NLP comprises the selected second ML model;
   retrieving price information for one or more of the list items from a database or from one or more vendors using application programming interfaces (APIs);
   generating an augmented image comprising the captured image and the price information; and
   displaying the augmented image on the user device.

2. The method of claim 1 comprising:
   for the one or more list items, positioning the corresponding price information proximate to the corresponding list item within the augmented image.

3. The method of claim 1 comprising:
   calculating a total price for the project list using the retrieved price information,
   wherein the augmented image comprises the total price.

4. The method of claim 3 comprising:
   positioning the total price proximate to the project list within the augmented image.

5. The method of claim 3 comprising:
   identifying negative space within the captured image; and
   positioning the total price over the negative space within the augmented image.

6. The method of claim 3 comprising:
   displaying, on the user device, user interface controls to remove items from the project list; and
   in response to the user removing an item from the project list, updating the total price for the project list within the augmented image.

7. The method of claim 1 wherein identifying the project list within the captured image comprises identifying a recipe within the captured image using machine learning models (ML) trained to recognize text within different categories of project lists, wherein retrieving the price information comprises retrieving the prices for one or more ingredients.

8. The method of claim 1 wherein identifying the project list within the captured image comprises identifying a grocery list within the captured image using machine learning models (ML) trained to recognize text within different categories of project lists, wherein retrieving the price information comprises retrieving the prices for one or more grocery items.

9. The method of claim 1 wherein retrieving the price information for the one or more list items comprises retrieving item data from a database.

10. The method of claim 1 comprising:
    determining a preferred vendor associated with a user of the user device,
    wherein retrieving the price information for the one or more list items comprises retrieving price information associated with the preferred vendor.

11. The method of claim 10 comprising:
    displaying, on the user device, one or more user interface controls for modifying user preferences, wherein the user preferences comprise at least the user's preferred vendor; and
    in response to the user modifying the user preferences, sending the user preferences to a server device, the server device configured to store the user preferences in a database.

12. The method of claim 1 comprising:
    determining a disposable income budget for a user of the user device; and
    calculating a relative cost of the project list using the disposable income budget,
    wherein the augmented image comprises the relative cost of the project list.

13. A server device comprising:
    one or more processors;
    an application programming interface (API) module configured for execution on the processors to receive requests from and send responses to a user device;
    an items module configured for execution the processors to:
       receive, from the user device via the API module, a list of items associated with a project list;
       retrieve, from a database, price information for the list of items from a database or from one or more vendors using application programming interfaces (APIs); and
       send the price information to the user device via the API module;
    wherein the user device is configured to:
       capture an image using a camera of the user device;
       identify the project list within the captured image using computer vision (CV), by:
          selecting a first machine learning (ML) model based on a project type associated with the project list; and
          applying the CV to the project list, wherein the CV comprises the selected first ML model;
       extract from the captured image, using natural language processing (NLP), the list of items associated with the project list, the list of items represented as text by:
          selecting a second machine learning (ML) model based on the project type associated with the project list; and
          applying the NLP to the project list, wherein the NLP comprises the selected second ML model;
       generate an augmented image comprising the captured image and the price information; and
       display the augmented image on the user device.

* * * * *